(12) United States Patent
Solomon

(10) Patent No.: US 7,725,640 B2
(45) Date of Patent: May 25, 2010

(54) ADAPTER CARD REPLAY BUFFER FOR SYSTEM FAULT ANALYSIS

(75) Inventor: Richard L. Solomon, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 122 days.

(21) Appl. No.: 12/148,308

(22) Filed: Apr. 18, 2008

(65) Prior Publication Data

US 2009/0265496 A1 Oct. 22, 2009

(51) Int. Cl.
*G06F 13/00* (2006.01)

(52) U.S. Cl. .................. 710/310; 710/313; 710/315; 710/316

(58) Field of Classification Search .................. 710/310, 710/313, 315, 316
See application file for complete search history.

(56) References Cited

U.S. PATENT DOCUMENTS 6,629,158 B1 * 9/2003 Brant et al. .................. 710/10
2005/0232298 A1 * 10/2005 Beverly et al. ............... 370/463
2006/0224920 A1 * 10/2006 Rooholamini et al. ......... 714/25
2007/0121495 A1 * 5/2007 Breti et al. ................... 370/229
2009/0094401 A1 * 4/2009 Larson et al. ................ 710/316

* cited by examiner

*Primary Examiner*—Glenn A Auve
(74) *Attorney, Agent, or Firm*—Suiter Swantz pc llo

(57) ABSTRACT

An adapter card for directing an information handling system (or another device) device to copy one or more data packets buffered in its memory may include an interface core. The interface core may comprise an electric circuit including electronic components and control logic for interfacing with the information handling system device. The adapter card may include a front end data channel coupled with the interface core for transmitting a data packet between the electronic components and the information handling system device. The adapter card may buffer a data packet according to a particular interface format and/or may include a buffer for storing the data packet. The adapter card may include control logic configured to direct the information handling system device to copy the data packets buffered in the memory of the adapter card.

17 Claims, 2 Drawing Sheets

ADAPTER CARD REPLAY BUFFER FOR SYSTEM FAULT ANALYSIS

TECHNICAL FIELD

The present disclosure generally relates to the field of adapter cards, and more particularly to an adapter card for connecting to an information handling system device.

BACKGROUND

An expansion card (also known as an expansion board, an adapter card, and an accessory card) may be connected to an information handling system device, such as a personal computer, for adding functionality to a computer system. When such a computer system experiences a failure, it may be difficult to determine which device(s) were responsible for causing the failure. Further complicating matters, such analysis has often required removing the expansion card from the computer system for external analysis to determine if the expansion card is at fault.

SUMMARY

An adapter card for interfacing with an information handling system device and directing the information handling system device to copy one or more data packets buffered in its memory may include an interface core for connecting to a component of the information handling system device. The interface core may comprise an electric circuit including electronic components and control logic for interfacing with the information handling system device. The adapter card may include a front end data channel coupled with the interface core for connecting the electric circuit to the component and transmitting a data packet between the electronic components and the information handling system device.

In some embodiments, the data packets may be buffered in the memory of the adapter card according to a particular interface format, such as the Peripheral Component Interconnect (PCI) Express format. In other embodiments, the adapter card may include a buffer for storing the data packets. The adapter card may include control logic configured to direct the information handling system device (or another device) to copy the data packets buffered in the memory of the adapter card.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
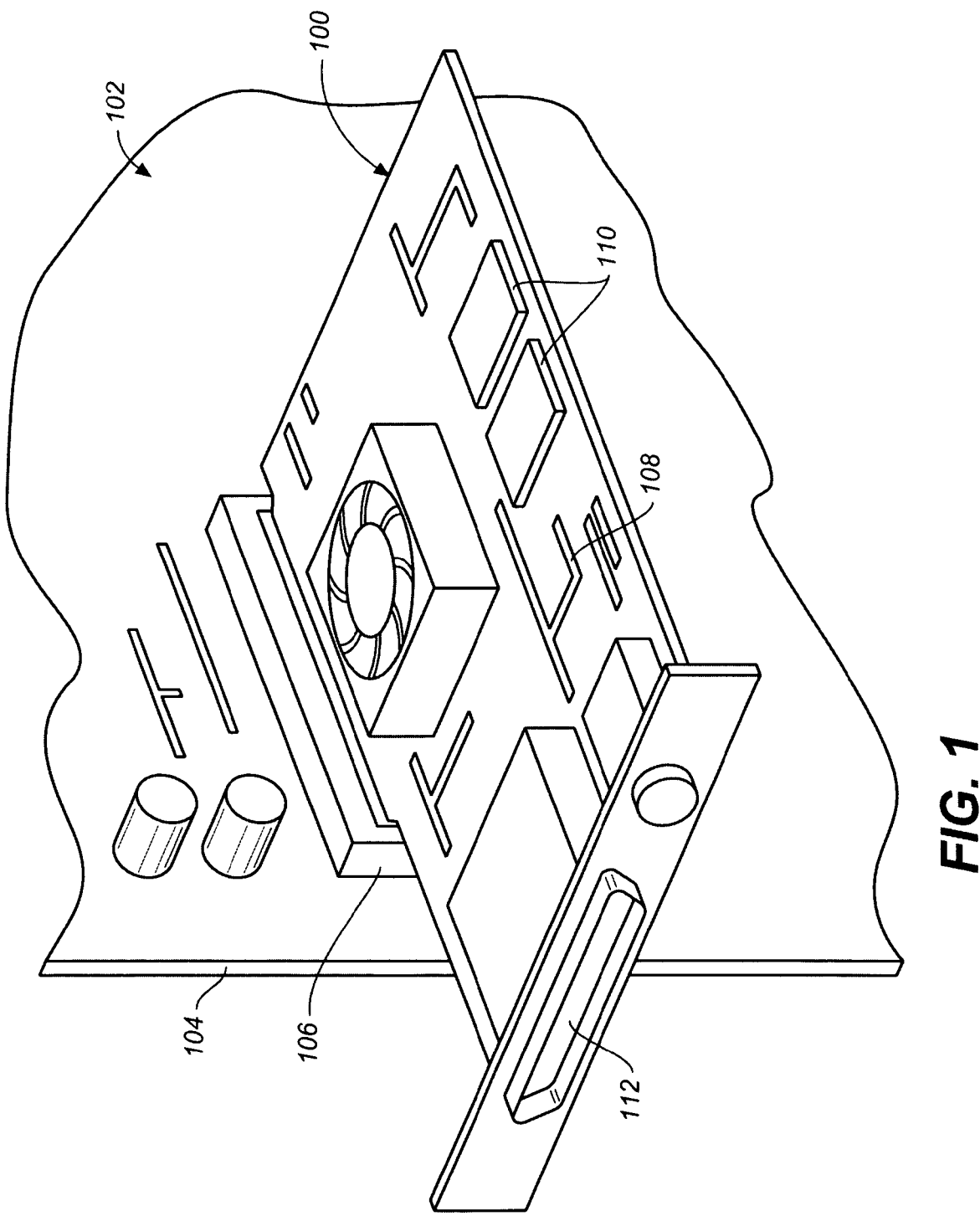
FIG. 1 is a partial isometric view illustrating an adapter card connected to an information handling system device.
Figure 2:
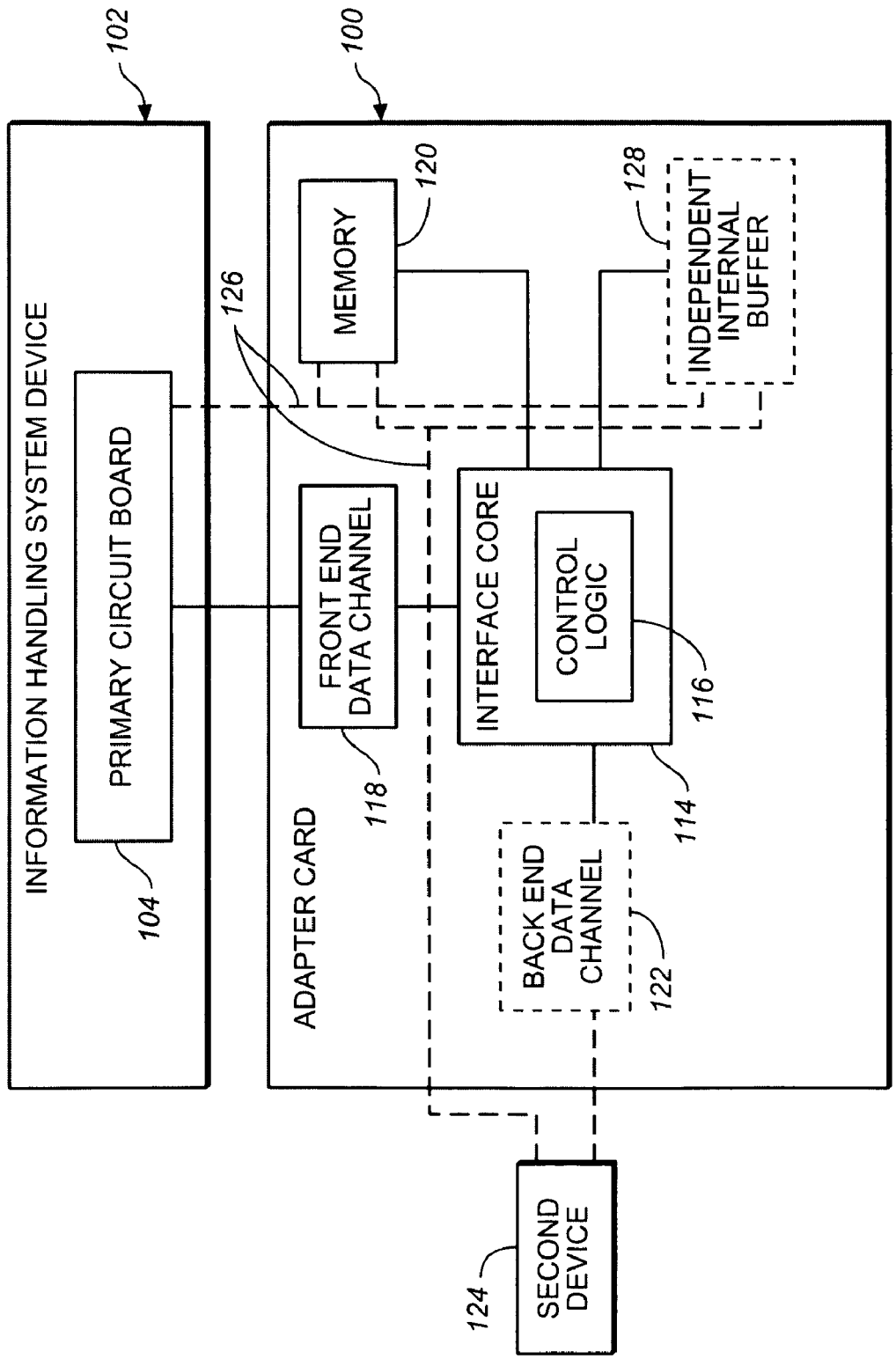
FIG. 2 is a block diagram illustrating a system for interfacing with an information handling system device.

Referring now to FIGS. 1 through 2, an adapter card 100 for interfacing with an information handling system device 102 is described in accordance with embodiments of the present invention. The adapter card 100 may comprise an expansion card, an expansion board, an accessory card, as well as a variety of other devices for interfacing with the information handling system device 102. The information handling system device 102 may comprise any type of electronic device having the ability to store, retrieve, and/or process data (e.g., a desktop computer, a laptop computer, and/or a server). The information handling system device 102 may include a primary circuit board 104 where calculations are performed for completing tasks assigned to the information handling system device 102.

In an implementation where the information handling system device 102 comprises a desktop PC, the primary circuit board 104 may include a mainboard/motherboard (e.g., a printed circuit board including a Central Processing Unit (CPU), one or more buses, memory sockets, and/or expansion slots). In one embodiment, the adapter card 100 may be connected to a component of the information handling system device (e.g., the primary circuit board 104) via an expansion slot 106. In other embodiments, the adapter card 100 may be connected to a component of the information handling system device via a direct/soldered connection, while in still further embodiments, the adapter card 100 may be wirelessly connected to a component of the information handling system device.

The adapter card 100 comprises an electric circuit 108 including one or more electronic components 110. For example, the adapter card 100 may include a printed circuit board having an electric circuit 108 utilizing conductive pathways (traces) etched from copper sheets and laminated onto a non-conductive substrate. The traces may be connected to the electronic components 110, including processing units, memory, specialized microchips, fans, input/output ports, and the like. In some embodiments, the adapter card 100 may add functionality to the information handling system device 102. For example, the adapter card 100 may include a port 112 for connecting an external device (e.g., a printer, a monitor, an external disk drive) to the information handling system device 102. In this configuration, the adapter card 100 may be utilized for controlling data exchanged between the external device and the information handling system device 102.

The electric circuit 108 and one or more of the electronic components 110 may generally form an interface core 114 including control logic 116 for interfacing with the information handling system device 102. It will be appreciated that the interface core 114 and/or the control logic 116 may be configured to interface with the information handling system device 102 according to a variety of standards. In one specific instance, the interface core 114 may implement the Peripheral Component Interconnect (PCI) Express interface format. In other embodiments, the interface core 114 may implement other interface formats/standards.

The adapter card 100 includes a front end data channel 118 coupled with the interface core 114 for connecting the electric circuit 108 to the primary circuit board 104. For example, the adapter card 100 may include a front end data channel 118 accessible via connectors provided on the substrate of the adapter card 100 and accessible via the expansion slot 106 of the primary circuit board 104. The front end data channel 118 may be utilized for transmitting a data packet between the electronic components 110 and the information handling system device 102. For instance, a data packet may be transmitted from an external device to the information handling system device 102 via a pathway including an input/output port, such as port 112. In another instance, a data packet may be transmitted from a specialized microchip included with the adapter card 100 to the information handling system device 102. The front end data channel 118 may comprise a PCI Express interface as previously de scribed.

The adapter card 100 includes a memory 120 for buffering a data packet after transmitting the data packet to the information handling system device 102. For example, when the adapter card 100 implements the PCI Express interface format, the interface core 114 may buffer recently sent packets in order that the packets may be retransmitted on demand (e.g., buffering packets in the PCI Express Replay Buffer). These recently sent packets may be stored in the memory 120. The control logic 116 of the interface core 114 may be configured to direct the information handling system device 102 connected to the interface core 114 to copy one or more data packets buffered in the memory 120. For example, in one specific embodiment, the buffer required by the PCI Express interface format and stored in the memory 120 may be expanded to several times the size required. Then, packets stored in the memory 120 may be copied by the information handling system device 102 as desired via the PCI Express interface. In another specific embodiment, the buffer required by the PCI Express interface format and stored in the memory 120 may be sized as required, though the number of retained packets would be smaller than if the buffer were expanded.

The adapter card 100 may include a back end data channel 122 coupled with the interface core 114 for connecting the electric circuit 108 to a second device 124 (e.g., a printer, a monitor, an external disk drive). For example, the adapter card 100 may include a back end data channel 122 accessible via the port 112. The back end data channel 122 may be utilized for transmitting a data packet between the second device 124 and the information handling system device 102. For instance, a data packet may be transmitted from the second device 124 to the information handling system device 102 via a pathway including the port 112, the back end data channel 122, and the front end data channel 118. In another instance, a data packet may be transmitted from a specialized microchip included with the adapter card 100 to the second device 124. The back end data channel 122 may comprise a Small Computer System Interface (SCSI), a Serial Attached SCSI (SAS), a Fibre Channel, or another interface as desired.

The control logic 116 of the interface core 114 may be configured to control the second device 124 connected to the interface core 114 to copy one or more data packets buffered in the memory 120. For example, in one specific embodiment, the buffer required by the PCI Express interface format and stored in the memory 120 may be expanded to several times the size required. Then, packets stored in the memory 120 may be copied by the second device 124 as desired.

It is contemplated that a second data channel 126 may be provided to the memory 120 outside of the control logic 116 of the interface core 114. In this manner, the information handling system device 102 may access the data packets buffered in the memory 120 outside of the control logic 116 of the interface core 114 (e.g., outside of PCI Express core logic). Further, it is contemplated that the adapter card 100 may include a buffer (e.g., an independent internal buffer 128) separate from the memory 120 for storing data packets. This independent internal buffer 128 could be connected to the information handling system device 102 and/or the second device 124 via the control logic 116 of the interface core 114 and/or the second data channel 126 outside of the control logic 116 of the interface core 114.

It is contemplated that a number of triggers may be provided for allowing the interface core 114 to direct the information handling system device 102 (or another agent) to copy the contents of the buffer to a less-volatile memory (e.g., Random Access Memory (RAM) connected to the primary circuit board 104). For example, the interface core 114 may be configured to direct the information handling system device 102, the second device 124, and/or another device to copy data packets from the memory 120 (and/or from the independent internal buffer 128) upon one or more of a detected error, a set pattern value, a back end logic-initiated signal, or the like. For instance, the second device 124 may provide the interface core 114 with corrupted data. This may trigger the interface core 114 to direct the information handling system device 102 to copy the contents of the memory 120 to RAM included with the primary circuit board 104 for later analysis.

The interface core 114 may be configured to stall data transmission between the electronic components 110 and the information handling system device 102 and/or the second device 124 while data buffered in the memory 120 is copied. This may allow the information handling system device 102 or another party to take an accurate "snapshot" of the interface core 114 and its associated data packets. Further, it is contemplated that this stall may be optional. In this manner, external agents could choose to routinely copy the internal buffer for performance analysis and/or to create potentially larger traceback buffers without a substantial reduction in performance.

It will be appreciated that within the context of a PCI Express implementation, the area impact for an expanded replay buffer within the memory 120 should be less than linear, because it may be more area efficient to utilize a larger RAM as opposed to several smaller RAM chips. Further, it is contemplated that expanding the replay buffer may also provide improved PCI Express performance, adding additional value to the analysis function.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system, comprising:

an interface core for connecting to a component of an information handling system device, the interface core comprising an electric circuit including one or more electronic components and control logic for interfacing with the information handling system device;

a front end data channel coupled with the interface core for connecting the electric circuit to the component and transmitting at least one data packet between the one or more electronic components and the information handling system device; and a memory for buffering the at least one data packet after transmitting the at least one data packet, wherein the control logic of the interface core is operatively configured to direct at least one of the information handling system device or another device connected to the interface core to copy the at least one data packet buffered in the memory, the interface core being operatively configured to direct at least one of the information handling system device and another device connected to the interface core to copy the at least one data packet buffered in the memory upon one or more of a detected error, a set pattern value, and a back end logic-initiated signal.

2. The system of claim 1, wherein the front end data channel comprises a Peripheral Component Interconnect (PCI) Express interface.

3. The system of claim 1, further comprising a second data channel coupled with the memory for providing access to the at least one data packet buffered in the memory from outside of the control logic.

4. The system of claim 1, further comprising a back end data channel coupled with the interface core for connecting the electric circuit to a second device and transmitting the at least one data packet between the second device and the information handling system device.

5. The system of claim 4, wherein the back end data channel comprises at least one of a Small Computer System Interface (SCSI), a Serial Attached SCSI (SAS), or a Fibre Channel.

6. A system, comprising:
   an interface core for connecting to a component of an information handling system device, the interface core comprising an electric circuit including one or more electronic components and control logic for interfacing with the information handling system device;
   a front end data channel coupled with the interface core for connecting the electric circuit to the component and transmitting at least one data packet between the one or more electronic components and the information handling system device; and
   a memory for buffering the at least one data packet after transmitting the at least one data packet,
      wherein the control logic of the interface core is operatively configured to direct at least one of the information handling system device or another device connected to the interface core to copy the at least one data packet buffered in the memory, wherein the interface core is operatively configured to stall transmissions of data between the one or more electronic components and the information handling system device while the at least one data packet buffered in the memory is being copied.

7. A system, comprising:
   an interface core for connecting to a component of an information handling system device, the interface core comprising an electric circuit including one or more electronic components and control logic for interfacing with the information handling system device;
   a front end data channel coupled with the interface core for connecting the electric circuit to the component and transmitting at least one data packet between the one or more electronic components and the information handling system device; and
   a buffer for buffering the at least one data packet after transmitting the at least one data packet,
      wherein the control logic of the interface core is operatively configured to direct at least one of the information handling system device or another device connected to the interface core to copy the at least one data packet buffered in the buffer, the front end data channel comprises a Peripheral Component Interconnect (PCI) Express interface and the buffer comprises a PCI Express Replay Buffer.

8. The system of claim 7, further comprising a second data channel coupled with the buffer for providing access to the at least one data packet buffered in the buffer from outside of the control logic.

9. The system of claim 7, further comprising a back end data channel coupled with the interface core for connecting the electric circuit to a second device and transmitting the at least one data packet between the second device and the information handling system device.

10. The system of claim 9, wherein the back end data channel comprises at least one of a Small Computer System Interface (SCSI), a Serial Attached SCSI (SAS), or a Fibre Channel.

11. A system, comprising:
    an interface core for connecting to a component of an information handling system device, the interface core comprising an electric circuit including one or more electronic components and control logic for interfacing with the information handling system device;
    a front end data channel coupled with the interface core for connecting the electric circuit to the component and transmitting at least one data packet between the one or more electronic components and the information handling system device; and
    a buffer for buffering the at least one data packet after transmitting the at least one data packet,
       wherein the control logic of the interface core is operatively configured to direct at least one of the information handling system device or another device connected to the interface core to copy the at least one data packet buffered in the buffer, the interface core is operatively configured to direct at least one of the information handling system device and another device connected to the interface core to copy the at least one data packet buffered in the buffer upon one or more of a detected error, a set pattern value, and a back end logic-initiated signal.

12. A system, comprising:
    an interface core for connecting to a component of an information handling system device, the interface core comprising an electric circuit including one or more electronic components and control logic for interfacing with the information handling system device;
    a front end data channel coupled with the interface core for connecting the electric circuit to the component and transmitting at least one data packet between the one or more electronic components and the information handling system device; and
    a buffer for buffering the at least one data packet after transmitting the at least one data packet,
       wherein the control logic of the interface core is operatively configured to direct at least one of the information handling system device or another device connected to the interface core to copy the at least one data packet buffered in the buffer, the interface core is operatively configured to stall transmissions of data between the one or more electronic components and the information handling system device while the at least one data packet buffered in the buffer is being copied.

13. A system, comprising:
    an interface core for connecting to a component of an information handling system device, the interface core comprising an electric circuit including one or more electronic components and control logic for interfacing with the information handling system device;
    a front end data channel coupled with the interface core for connecting the electric circuit to the component and transmitting at least one data packet between the one or more electronic components and the information handling system device; and
    means for buffering the at least one data packet after transmitting the at least one data packet, wherein the control logic of the interface core is operatively configured to direct at least one of the information handling system device or a second device connected to the interface core to copy the at least one data packet from the buffering means, the interface core is operatively configured to direct at least one of the information handling system device and another device connected to the interface core to copy the at least one data packet buffered in the buffering means upon one or more of a detected error, a set pattern value, and a back end logic-initiated signal.

14. The system of claim 13, wherein the front end data channel comprises a Peripheral Component Interconnect (PCI) Express interface.

15. The system of claim 13, further comprising a second data channel coupled with the buffering means for providing access to the at least one data packet buffered in the buffering means from outside of the control logic.

16. The system of claim 13, further comprising a back end data channel coupled with the interface core for connecting the electric circuit to a second device and transmitting the at least one data packet between the second device and the information handling system device.

17. A system, comprising:
an interface core for connecting to a component of an information handling system device, the interface core comprising an electric circuit including one or more electronic components and control logic for interfacing with the information handling system device;
a front end data channel coupled with the interface core for connecting the electric circuit to the component and transmitting at least one data packet between the one or more electronic components and the information handling system device; and
means for buffering the at least one data packet after transmitting the at least one data packet,
wherein the control logic of the interface core is operatively configured to direct at least one of the information handling system device or a second device connected to the interface core to copy the at least one data packet from the buffering means, the interface core is operatively configured to stall transmissions of data between the one or more electronic components and the information handling system device while the at least one data packet buffered in the buffering means is being copied.

* * * * *